United States Patent [19]
Bolto

[11] 3,941,724
[45] Mar. 2, 1976

[54] PRODUCTION OF AMPHOTERIC RESINS IN A REACTION MEDIUM COMPRISING FORMIC ACID

[75] Inventor: Brian Alfred Bolto, Mitcham, Australia

[73] Assignees: ICI Australia Limited, Melbourne; Commonwealth Scientific and Industrial Research Organization, Campbell, both of Australia

[22] Filed: July 26, 1974

[21] Appl. No.: 492,966

[30] Foreign Application Priority Data
Aug. 9, 1973 Australia............................ 4415/73

[52] U.S. Cl...... 260/2.1 R; 260/78 UA; 260/78.5 R; 260/2.1 M; 260/80.3 N; 260/88.3 R; 204/159.22

[51] Int. Cl.². C08F 20/04; C08J 5/20; C08F 22/02; C08F 2/54

[58] Field of Search........ 260/80.3 N, 2.1 R, 2.1 M, 260/78.5 R, 78 UA; 450/703

[56] References Cited
UNITED STATES PATENTS

| | | | |
|---|---|---|---|
| 2,949,442 | 8/1960 | Clavier et al. ................. | 260/80.3 N |
| 3,032,538 | 5/1962 | Spaulding et al. ............. | 260/80.3 N |
| 3,808,158 | 4/1974 | Bolto ............................. | 260/80.3 N |
| 3,839,237 | 10/1974 | Battaerd et al. ................ | 260/80.3 N |
| 3,891,576 | 6/1975 | Battaerd et al. ................ | 260/2.1 R |

*Primary Examiner*—Joseph L. Schofer
*Assistant Examiner*—Maria S. Tungol
*Attorney, Agent, or Firm*—Cushman, Darby & Cushman

[57] ABSTRACT

In the known process of manufacturing an amphoteric polymeric composition which process comprises firstly polymerising a mixture comprising a monomer containing a basic group and a monomer containing an acidic group, the improvement of carrying out the process in the presence of a solvent system comprising formic acid.

7 Claims, No Drawings

PRODUCTION OF AMPHOTERIC RESINS IN A REACTION MEDIUM COMPRISING FORMIC ACID

This invention is concerned with ion-exchange resins which have both acidic and basic ion-exchange sites. Such "amphoteric" resins may be formed as a composite of acidic and basic ion-exchange sub-particles or moieties in an ion-permeable matrix. They may also be formed as a true or block copolymer, as a resin comprising an interlocked mixture of at least two polymers which may be in the form of either interpenetrating networks or the so-called "snake-cage" polymers — or as a resin comprising a mixture of these various types of structure in the one composition having these desired ion-exchange properties.

Amphoteric ion-exchange resins are of use in the purification of biological media and polymers, and pharmaceuticals, for example, penicillin, cosmetics, slow release medicines and water demineralisation processes. Amphoteric ion-exchange resins are of use because of their property of sequestering or chelating metal ions, in particular heavy metal ions.

Amphoteric ion-exchange resins also have a potentially important application in water demineralisation processes using thermally regenerable ion-exchange resins, for example the "Sirotherm" process. ("Sirotherm" is a Registered Trade Mark for ICI Australia's thermally regenerable ion-exchange resins). The "Sirotherm" process is described in the publications:
"The Sirotherm" Demineralisation Process — an Ion Exchange Process with Thermal Regeneration", Part 1. J. Inst. Engr. Aust. (1965) 37, 193;
"An Ion-Exchange Process with Thermal Regeneration", Aust. J. Chem. (1966), 19, 561 (Part II), 589 (Part III), 765 (Part IV) and 791 (Part V)
Australian Journal of Chemistry (1968) 21, pp 2703–2710, "An Ion-Exchange Process with Thermal Regeneration", Part VI;
"Thermally Regenerated Ion-Exchange Process — An Aid to Water Management", J. Water Poll. Control Fed. (1966), 38, 1782;
and Australian Pat. No. 274,029.

Resins having a thermally regenerable ion-exchange capacity of use in the "Sirotherm" process are of the weak-acid or weak-base type and have such inherently slow rates of salt-uptake that their use in conventional mixed-bed systems is impractical for large-scale water treatment. As it would be expected that smaller acidic and basic particles and closer particle spacing should greatly improve the rate of ion-exchange, attempts have been made to produce amphoteric resins having acidic and basic moieties; but, although the ion-exchange rates can be high, such polymers normally have a thermally regenerable ion-exchange capacity of no more than a few percent of the chemically regenerable total capacity, and certainly below 0.2 meq/gm, which renders them quite impractical for water demineralisation.

One attempt to avoid these difficulties is the use of a particulate amphoteric ion-exchange resin in which minute but discrete particles of ion-exchange resins are incorporated in an ion-permeable matrix. Though the ion-exchange rates of such "plum-pudding" resins are interior to the amphoteric polymers previously mentioned, the thermally regenerable capacities are superior, and the overall kinetics are much better than those of a conventional mixed bed.

It has been postulated that the ion-exchange rates of mixed beds of weak electrolyte resins are probably limited by the rate of proton transfer between the acidic and basic resins, even where the dimensions of the ion-exchange particles and their spacing is of the order of microns; and that the ion-exchange capacity of an amphoteric polymer is probably limited by self-neutralisation, that is pairing of moieties of opposite polarity within the polymer itself. Thus, very close spacing of acidic and basic moieties is highly desirable but the tendency for self-neutralisation must be minimised. Moreover, it is also appreciated that self-neutralisation probably takes place to a large degree in the constituent acidic and basic components of the system before or during the formation of the final polymeric structure.

We have now found a method of substantially reducing self-neutralisation of the acidic and basic moieties during polymerisation and of obtaining an amphoteric resin of increased ion-exchange capacity.

In the known process of manufacturing a polymeric composition which process comprises firstly polymerising a mixture comprising a monomer containing a basic group and a monomer containing an acidic group we provide the improvement of carrying out the process in the presence of a solvent system comprising formic acid.

The amount of formic acid is not narrowly critical but preferably the formic acid comprises a major proportion of the solvent system. Preferably the weight ratio of formic acid to acidic monomer is in the range from 1:5 to 5:1.

Formic acid appears unique in its ability to prevent self neutralisation reactions occuring during the preparation of amphoteric resins. We have found that other carboxylic acids such as acetic acid or propionic acid are not satisfactory solvents for the polymerisation of a mixture of acidic and basic monomers as the resultant product has neglible thermally regenerable ion-exchange activity.

The process may be carried out in the presence of a minor proportion of an additional solvent. If an additional solvent is used it is preferably a solvent in which all the monomers are soluble. e.g. water or a polar organic solvent such as acetone, dimethylformamide, acetonitrile, dimethyl sulphoxide, methyl ethyl ketone, lower alkyl alcohols containing from 1 to 6 inclusive carbon atoms, e.g. methanol, ethanol, propan-2-ol, butan-1-ol.

The monomers chosen for the preparation of the resins in accordance with the present invention may be, typically, those known in the art to be suitable for the production of ion-exchange resins. The basic sites may, for example, be derived from any weakly basic groups, such as substituted amines, preferably ethylenically substituted amines such as allylamines and especially triallylamine; similarly, acidic sites may be those derived from unsaturated carboxylic acids containing groups such as acrylic acid and methacrylic acid. Other monomers which would be suitable for resins of this type include basic monomers such as N-alkylethyleneimines, dimethylaminoethyl methacrylate, t-butylaminoethyl methacrylate, N,N-dialkylaminomethylstyrene and acidic monomers such as maleic acid, vinylacetic acid, allylacetic acid, maleamic acid, N-alkylmaleamic acids, N-arylmaleamic acids and the like.

The nature of the allylamine if present is not narrowly critical and the composition of our invention may be prepared using any amine having one or more allyl substituents. Suitable allylamines include, for example, allylamine, diallylamine, triallylamine and alkyldiallylamines. Other suitable allylamines include compounds of the general formula I

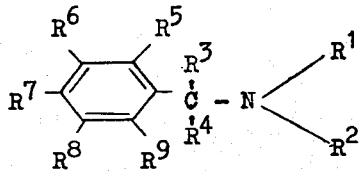

wherein $R^1$ is an allyl group; $R^2$ is either a hydrogen atom or an alkyl or substituted alkyl, which group being either saturated or olefinically unsaturated; $R^3$, $R^4$, $R^5$, $R^6$ and $R^7$ separately, is a hydrogen or halogen atom or an alkyl, substituted alkyl, aryl, substituted aryl, nitro, dialkylamino alkyl or

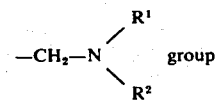 group except that not more than two of $R^3$, $R^4$, $R^5$, $R^6$ and $R^7$ may be the group

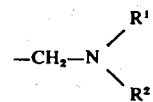

and except that not more than four of $R^3$, $R^4$, $R^5$, $R^6$ and $R^7$ may be hydrogen.

Preferably the olefinically unsaturated group is allyl. A preferred class of compounds of general formula 1 as defined hereinbefore consists of compounds of general formula II:

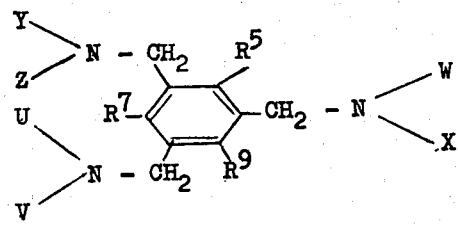

wherein $R^5$, $R^7$ and $R^9$ are as defined hereinabove and U, V, W, X, Y and Z are allyl. A further preferred class of compounds of general formula I as defined hereinbefore consists of compounds of general formula III.

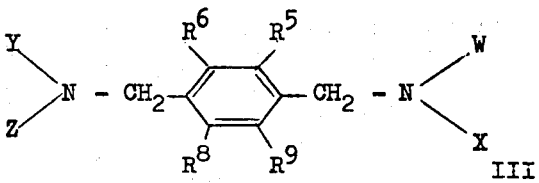

wherein $R^5$, $R^6$, $R^8$ and $R^9$ are as defined hereinabove and W, X, Y and Z are allyl.

Other suitable allylamines include, for example, amines of the general formula IV:

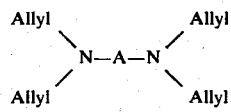

where A is an alkylene group containing 2 to 8, preferably 5 to 7 inclusive carbon atoms, for example, 1,6-bis(N,N-diallylamino)hexane.

Preferred monomers for use in the preparation of ion-exchange resins suitable for use in the "Sirotherm" process include, for example: triallylamine, methyldiallylamine, ethyldiallylamine, 1,4-bis(N,N-diallylaminomethyl) benzene, 2,4,6-tris(N,N-diallylaminomethyl)toluene, 1,2,4-tris(N,N-diallylaminomethyl)benzene, 1,6-bis(N,N-diallylamino)hexane, n-propyldiallylamine, benzyldiallylamine.

It will be understood by those skilled in the art that, in order to polymerize the allylamines must normally be present as salts. Hence all references in this specification to the polymerisation of allylamines, even when not specifically described as salts, are to the amines in their polymerisable form.

Suitable salts are the salts of allylamines with strong acids such as, for example, hydrochloric, sulphuric, nitric or phosphoric acid. However, the amine monomer may also be used in the free base form; upon the addition of formic acid the amine formate is produced. Generally speaking, the pH, temperature and other conditions associated with the polymerisation process may be those known in the art for the polymerisation of the appropriate monomers concerned. The nature of the polymerisation initiator is not critical. Radiation initiated polymerisation is particularly convenient. Nevertheless, monomers have been successfully polymerised by the use of chemical initiators to yield resins with analogous ion-exchange properties to those of essentially the same resin prepared in the same way but employing gamma radiation for polymerisation. When aqueous solvent systems are used, water soluble initiators of various sorts, such as potassium persulphate, alpha, alpha'-azo-bis-bis-beta-cyanoisovaleric acid, alpha, alpha'-azo-bis-isobutyronitrileamidinium hydrochloride and cumene hydroperoxide, and various redox systems such as $K_2S_2O_8/K_2S_2O_5$ and cumene hydroperoxide/$FeSO_4$ may be employed. When the more preferred solvent systems comprising polar solvents such as acetone, dimethylformamide and the like are used, chemical initiators such as alpha, alpha'-azo-bis-isobutyronitrile, cetyl peroxide carbonate, lauryl peroxide, t-butyl perpivalate, t-butylcyclohexyl peroxydicarbonate, azo-bis-dimethyl-valero nitrile, benzoyl peroxide and organic soluble analogues thereof may be employed.

In certain cases it is advantageous to combine chemical initiation with radiation initiation. For example, it is possible to increase the degree of crosslinking of a polymer formed by chemical initiation if the polymer is further treated with radiation.

It is possible to use irradiation as the initiator. Irradiation can be used to initiate the polymerisation of all the allylamines in the form of salts.

Accordingly in one aspect of our invention we provide a process of manufacturing polymeric compounds, said process comprising exposing the mixture as defined hereinbefore to high energy radiation at a temperature of between −80° and 120°C and isolating the polymer or polymer salt so formed.

By high energy radiation we mean radiation having a wavelength of less than 100 Angstrom, in particular gamma- and beta- rays derived from isotopes or in the form of fast electrons such as produced by a Van de Graaff generator and an electron accelerator. Other sources of ionising or high energy radiation are known in the art, e.g. from British Pat. No. 801,528, page 1, lines 49 – 56; these include neutrons, accelerated heavy particles and X-rays or mixtures of them. A convenient practical source of high energy radiation is a cobalt 60 source.

The dose rate of irradiation controls the rate of initiation of the polymerisation, but has little effect on the properties of the polymer formed. Dose rates between 10 rad/hr and 5 megarad/hr are operative and rates between 20,000 rad/hr and 1 megarad/hr are convenient in practice. However, the total dose delivered to the polymerisation mixture affects the yield as well as the physical properties of the polymer produced. Doses from 3 megarad up to 20 megarad are operative; optimum yield of polymer is usually achieved at 5 to 15 megarad.

Radiation, usually and preferably, is carried out in an inert atmosphere such as nitrogen or argon. The presence of air does not stop the polymerisation, but a reduction in yield and capacity was observed.

For use as ion-exchange resins the polymers and copolymers of this invention must be produced within controlled particle size ranges.

The particles of the required size range may be obtained by bulk polymerisation followed by grinding and sieving. Preferably the particles are prepared in the required size range by a dispersion polymerisation technique.

It will be appreciated by those skilled in the art that the solvent and monomer systems referred to above concern the components which are actively involved in the production of the desired amphoteric resins.

The polymerisation is preferably carried out in a medium which will dissolve the monomer components to form a homogeneous solution. In some cases it may be advantageous to partially polymerise one of the monomers before the other monomer is added.

Whether the resins are produced in bulk or particulate form can be determined by the use of a secondary liquid phase which need not include any reacting components but merely makes it possible to disperse the monomer solution in a supporting medium which is immiscible with the monomers and the solvent used to make up the monomer solution. In this way, the product can be made in the form of particulate bead-like material having a particle size which makes it suitable for use in ion-exchange columns. The size of the beads depends on the concentration of stabilisers, the monomer solution, the stirring rate, the temperature and the geometry of the reaction vessel. Beads between 200 mesh BSS and 10 mesh BSS can easily be achieved. The choice of supporting medium is not narrowly critical, provided the insolubility requirements are satisfied.

Suitable supporting media are solvents which form two separate phases when mixed with the solution of monomers. Convenient supporting media are non-polar solvents such as for example, petroleum ether, paraffin oils, aromatic hydrocarbons or chlorinated hydrocarbons.

The choice of stabiliser is not narrowly critical; certain surfactants used in dispersion polymerisation, e.g. hydrocarbon soluble surface active agents as well as cellulose ethers or polyvinyl alcohols and derivative polyvinyl alcohols are suitable.

Following polymerisation and washing to remove low molecular weight material, it is preferable to subject the product resin in particulate form to a pH equilibration treatment to achieve the optimum ion-exchange performance. Normally, this simply involves stirring the resin in an aqueous salt solution at room temperature (ca.20°C) and adding sodium hydroxide until the desired pH level is obtained, care being taken to ensure that the final equilibrium salt concentration employed is that of the water to be treated by the desalination process. The resin is now suitable for use in column operation of a thermally regenerable process, as described in our prior Australian Pat. No. 274,029. For purposes of evaluation, however, the resin may be washed with hot water at ca. 80°C to obtain it in a regenerated form, and the amount of salt taken up by stirring the regenerated resin in salt solution at room temperature used as a measure of the effective capacity of the system. The time necessary to achieve salt uptake equivalent to 50% of the equilibrium level (the "half time") may be used as a convenient measure of the rate of salt adsorption.

Finally, it will be appreciated that the amphoteric resins formed in accordance with the present invention must differ from the prior art amphoteric resins where self-neutralisation must involve association of oppositely charged sites which, from the steric or structural standpoint, defines a resin which is significantly different from one where self-neutralisation has been minimised. However, while this difference in structure is difficult to define by chemical or physical analysis, a ready indicator is provided by the significantly increased effective capacity.

The ion-exchange capacity of the product produced by our process depends to a great extent on the monomers used.

Suitable combinations of monomers to give a desired ion-exchange capacity may be found by simple experiment.

Thermally regenerable resins have a potentially important application in water demineralisation processes because low-grade heat can be efficiently employed for regeneration and certain of these resins are of use in the desalination of water by the so-called "Sirotherm" process.

For use in the "Sirotherm" process we prefer that the monomer containing a basic group is an allylamine.

Although a suitable amphoteric polymeric composition can be produced by the polymerisation of a mixture consisting solely of a basic and an acidic monomer or derivatives thereof, the number of monomers employed need not be restricted to two. In certain instances it may be advantageous to have more than one acidic or basic monomer, so that three, four or even more monomers may be present in the polymerisation mixture. A range of products may be prepared which are homofunctional in basic and acidic groups or homofunctional in only basic or acidic groups and heterofunctional in the other, or heterofunctional in both types of groups.

We have found that in certain cases it is advantageous to add a third monomer component which is preferably non-charged. We believe that it acts to separate the acidic and basic groups of the amphoteric polymeric composition thus further hindering self-neutralisation.

Suitable neutral third monomers are for example: vinyl acetate, methyl vinyl ether, styrene and the like.

Polymeric compositions having useful ion-exchange properties may be made when the proportion of the third monomer lies in the range from 0 – 70% w/w of the polymeric composition preferably from 5 – 50% w/w.

Preferably the third monomer is di-functional and acts as a crosslinking agent, leading to extension of the polymeric network.

Suitable crosslinking agents are, for example, ethylene glycol dimethacrylate, 1,3-butylene glycol dimethacrylate, divinylbenzene, triallyl cyanurate, the triallyl ether of pentaerythritol and the like. We believe that the addition of a crosslinking agent has a twofold purpose: to aid in the permanent separation of the acidic and basic sites, and to minimise loss of linear polymer. Hence if the crosslinking agent polymerises at a rate comparable with that of the acid monomer, two interpenetrating networks may be formed, with the crosslinked polyacid enmeshed in the polytriallylamine network, the latter being self-crosslinking. In cases where a non-crosslinking allylamine monomer is employed, a further crosslinking agent compatible with the allylamine may be used; two interpenetrating networks will again be formed.

We believe that the increase in effective capacity of such additionally crosslinked amphoteric polymeric compositions is due to the greater rigidity of the system; the ion-exchange groups cannot as readily relocate after the polymerisation because the network is held more firmly in its non-associated configuration.

The amount of crosslinking agent present is not narrowly critical but we have found that resins for use in the "Sirotherm" process may be prepared by polymerising mixtures comprising an allylamine salt, an acidic monomer in a solvent system as defined herein above and a crosslinking agent wherein the crosslinking agent is present in an amount from 0 – 50% w/w of the polymeric composition preferably from 10 – 30% w/w.

The compounds of our invention may be used as chelating agents and sequestering agents and in the purification of biological materials.

The invention is illustrated by but by no means limited to the following examples in which all parts are parts by weight unless otherwise specified.

EXAMPLE 1

This example illustrates the preparation of an amphoteric resin by the polymerization of methacrylic acid and triallylamine hydrochloride using gamma irradiation in the presence of formic acid.

Methacrylic acid (6.0 ml, 70 meq) was mixed with 70% solution of triallylamine hydrochloride (8.5 ml, 35 meq), together with 98% formic acid (10.0 ml, 260 meq). The homogeneous solution was deoxygenated by a vacuum treatment cycle, in which the mixture was cooled to liquid nitrogen temperature, and the container connected to a vacuum system where pumping was maintained for 2 minutes. The container was then sealed and placed in an acetone/dry ice slurry, and after thermal equilibrium had been established, pumping was carried out for 0.5 minutes. The cycle was repeated a number of times to ensure complete oxygen removal.

The sample was irradiated in vacuo using a $Co^{60}$ source at a dose rate of 0.3 megarad/hr, to give a total dose of 10 megarad. The hard, opaque mass which resulted was broken up into fine particles and the 16–60 mesh BSS fraction retained. It was extracted with ethanol under nitrogen in a Soxhlet apparatus for 12 hours to remove soluble organic material. The product was then washed in an ion-exchange column with 0.3N alkali, 2N hydrochloric acid, and water, using 20 bed volumes of the washing liquor in each case.

The particles were stirred in 1000 mg/l sodium chloride solution and the pH adjusted to 6.2 by the addition of alkali. When full equilibrium had been obtained the resin was regenerated with hot distilled water in a jacketed column at 80°C. The uptake of salt from a 1200 mg/l solution at ambient temperature was then measured and found to be 0.58 meq/g, which is a measusre of the thermally regenerable or effective capacity of the resin under these conditions.

EXAMPLE 2

This example illustrates the preparation of amphoteric resins by the polymerization of methacrylic acid and triallylamine hydrochloride using gamma irradiation in the presence of various solvents.

The resins were prepared as in Example 1. except that a range of solvents (10 ml) was used in lieu of formic acid.

The results obtained are tabulated below:

| Solvent | Effective Capacity (in meq/g) |
|---|---|
| Water | 0.00 |
| i - Propanol | 0.03 |
| n - Hexanol | 0.03 |
| Diethyl ether | 0.05 |
| Di-n-butyl ether | 0.01 |
| Dioxane | 0.06 |
| Dimethyl cellosolve | 0.14 |
| Dimethyl digol | 0.15 |
| Methoxy polyethylene glycol | 0.12 |
| Acetone | 0.08 |
| Methyl i-butyl ketone | 0.05 |
| Ethyl acetate | 0.12 |
| Dimethyl carbonate | 0.10 |
| Acetic acid | 0.02 |
| Propionic acid | 0.00 |

EXAMPLE 3

This example illustrates the preparation of a amphoteric resin by the polymerization of methacrylic acid and triallylamine hydrochloride using chemical initiation in the presence of formic acid.

Methacrylic acid (6.0 ml, 70 meq), a 70% solution of triallylamine hydrochloride (8.5 ml, 35 meq), 98% formic acid (10.0 ml, 260 meq) and alpha, alpha'-azobis-isobutyronitrile (0.3 g or 2.5% w/w on the two monomers) were mixed and shaken to achieve a clear, homogeneous solution. After dexoygenation, it was heated under nitrogen at 70°C for 17 hours. The solid product was worked up as described in Example 1.

EXAMPLE 4

This example outlines the preparation of an amphoteric resin by the suspension polymerization of acrylic acid and triallylamine hydrochloride using chemical initiation in the presence of formic acid.

Triallylamine hydrochloride solution (70% solution in water, 17.0 ml, 70 meg) was dehydrated on a boiling water bath using a water pump to evacuate the system, and to it was added acrylic acid (5.0 g, 70 meg) and commercial divinylbenzene, (54% divinylbenzene, 8.8 ml i.e. sufficient to give 20% crosslinking by weight, based on the total amount of polymerizable monomers present). To the cold solution was added alpha, alpha'-azo-bis-isobutyronitrile (0.46 g) as initiator and formic acid (10.0 ml).

The deoxygenated solution was added to paraffin oil (400 ml) containing sorbitan monooleate (4 ml), and stirred at 80° under nitrogen using a fixed-blade stirrer at 300 rpm.

The stirring was continued with heating overnight (17 hr). The solid beads were filtered off and washed with hexane, followed by acetone, using three alternating washes with each solvent. The beads were then washed in a column using 2N alkali, 2N hydrochloric acid, and water to pH3, to give a crosslinked amphoteric resin with the acid groups in the hydrogen form and the amino groups in the hydrochloride form.

I claim:

1. In the process of manufacturing a polymeric composition which process comprises firstly polymerizing a mixture comprising a monomer containing a basic group, said monomer being an ethylenically unsaturated substituted amine, and a monomer containing an acidic group, said latter monomer being an unsaturated carboxylic acid; the improvement of carrying out the process in the presence of a solvent system comprising formic acid.

2. A process according to claim 1 wherein formic acid comprises a major proportion of the solvent system.

3. A process according to claim 1 wherein the weight ratio of formic acid to acidic monomer is in the range from 1 : 5 to 5 : 1.

4. A process according to claim 1 wherein the ethylenically unsaturated substituted amine is chosen from the group consisting of triallylamine, methyl-diallylamine, ethyl-diallylamine, 1,4-bis(N,N-diallylaminomethyl) benzene, 2,4,6-tris(N,N-diallylaminomethyl)toluene, 1,2,4-tris(N,N-diallylaminomethyl)benzene, 1,6-bis(N,N-diallylamino)-hexane, n-propylidiallylamine, benzyldiallylamine.

5. A process according to claim 1 wherein the unsaturated carboxylic acid is chosen from the group consisting of maleic acid, vinylacetic acid, allylacetic acid, maleamic acid, N-alkylmaleamic acids and N-arylmaleamic acids.

6. A process according to claim 1 wherein the unsaturated carboxylic acid is acrylic acid or methacrylic acid.

7. A process according to claim 1 wherein the polymerization is initiated by a chemical free radical generator.

* * * * *